United States Patent
Loiseau (10) Patent No.: US 11,411,713 B2
(45) Date of Patent: Aug. 9, 2022

(54) MASKING METHOD AND SYSTEM FOR CRYPTOGRAPHY

(71) Applicant: COMMISSARIAT A L'ENERGIE ATOMIQUE ET AUX ENERGIES ALTERNATIVES, Paris (FR)

(72) Inventor: Antoine Loiseau, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 244 days.

(21) Appl. No.: 16/862,771

(22) Filed: Apr. 30, 2020

(65) Prior Publication Data

US 2020/0351073 A1    Nov. 5, 2020

(30) Foreign Application Priority Data

May 3, 2019   (FR) ...................................... 19 04667

(51) Int. Cl.
*H04L 9/00*    (2022.01)
*H04L 9/30*    (2006.01)

(52) U.S. Cl.
CPC .............. *H04L 9/002* (2013.01); *H04L 9/302* (2013.01); *H04L 2209/046* (2013.01)

(58) Field of Classification Search
CPC .... H04L 9/002; H04L 9/302; H04L 2209/046
USPC ........................................................ 713/189
See application file for complete search history.

(56) References Cited

U.S. PATENT DOCUMENTS

| | | | | |
|---|---|---|---|---|
| 10,289,816 B1 * | 5/2019 | Malassenet | ............. | G06F 21/75 |
| 2015/0244524 A1 * | 8/2015 | Pulkus | ................. | H04L 9/3006 |
| | | | | 380/28 |

FOREIGN PATENT DOCUMENTS

| | | | | |
|---|---|---|---|---|
| AU | 2011327986 A1 * | 5/2013 | ............. | H04L 9/002 |
| CA | 2732651 A1 * | 9/2011 | ........... | G01R 31/303 |
| CA | 2742530 A1 * | 12/2011 | ........... | H04L 9/0825 |
| EP | 3484093 A1 * | 5/2019 | ............. | G06F 7/723 |
| FR | 2926651 A1 * | 7/2009 | ............. | G06F 7/723 |
| FR | 2926652 A1 * | 7/2009 | ............... | G06F 7/72 |
| WO | WO-2004055665 A1 * | 7/2004 | ............. | G06F 7/535 |

(Continued)

OTHER PUBLICATIONS

Khurana et al., "Asymmetric optical image encryption using random Hilbert mask based on fast walsh hadamard transform", IEEE, doi: 10.1109/IC3TSN.2017.8284508, 2017, pp. 374-377. (Year: 2017).*

(Continued)

*Primary Examiner* — Peter C Shaw (74) *Attorney, Agent, or Firm* — Oblon, McClelland, Maier & Neustadt, L.L.P.

(57) ABSTRACT

An integrated circuit including a set of security modules configured to implement an asymmetric cryptography operation, the set of modules including a conditional exchange module configured to exchange first and second vectors used to manipulate input bits of a secret key, the conditional exchange module being suitable for applying an exchange formula including a combination of a condition of the input bit with the first and second vectors so that the latter are interchanged only if the condition of the input bit is equal to '1', the conditional exchange module including a masking module suitable for making use of at least one random number to mask said exchange formula before it is applied.

12 Claims, 3 Drawing Sheets

(56) References Cited

FOREIGN PATENT DOCUMENTS

| WO | WO-2007074149 A1 | * | 7/2007 | ............. | G06F 7/723 |
| WO | WO-2009003740 A1 | * | 1/2009 | ............. | G06F 7/728 |

OTHER PUBLICATIONS

Anshula et al., "Asymmetric image encryption based on the Discrete Cosine Transform using Random Phase Masks", IEEE, doi: 10.1109/IC3TSN.2017.8284473, 2017, pp. 184-187. (Year: 2017).*

Garg et al., "Candidate Indistinguishability Obfuscation and Functional Encryption for all Circuits", IEEE, doi: 10.1109/FOCS.2013.13, 2013, pp. 40-49. (Year: 2013).*

Qin et al., "A Method of Data Obfuscation Based on Monte Carlo Random Monotone Function", IEEE, doi: 10.1109/CSE-EUC.2017.147, 2017, pp. 752-755. (Year: 2017).*

French Preliminary Search Report dated Jan. 20, 2020 in French Application 19 04667 filed on May 3, 2019 (with English Translation of Categories of Cited Documents), 2 pages.

De Groot, "A performance study of X25519 on Cortex-M3 and M4", Sep. 1, 2015, XP55659417, URL: https://pure.tue.nl/ws/portalfiles/portal/47038543/800603-1.pdf, 30 pages.

Nascimento et al., "Attacking embedded ECC implementations through cmov side channels", IACR, International Association for Cryptologic Research, vol. 20160924:220308, Sep. 22, 2016, XP061021827, pp. 1-22.

Coron, "Resistance Against Differential Power Analysis for Elliptic Curve Cryptosystems", Cryptographic Hardware and Embedded Systems, 1999, 11 pages.

Joye et al., "The Montgomery Powering Ladder", Cryptographic Hardware and Embedded Systems, 2002, 12 pages.

Batina et al., "Online Template Attacks", INDOCRYPT, 2014, 17 pages.

U.S. Appl. No. 16/127,390, filed Sep. 11, 2018, 2019/0081786 A1, Loiseau, A, et al.

* cited by examiner

MASKING METHOD AND SYSTEM FOR CRYPTOGRAPHY

TECHNICAL FIELD

The present invention generally relates to the field of asymmetric cryptography and, more particularly, the protection of cryptography operations faced with attacks from auxiliary channels. It has in particular application in the field of on-board devices or the Internet of Things.

PRIOR ART

The implementations of asymmetric cryptography such as RSA or cryptography based on elliptic curves are encryption techniques that are highly used in many fields for example for exchanging keys, digital signatures, etc. In particular, cryptography on elliptic curves is economical in terms of key length and calculation time, which renders the use thereof particularly attractive in on-board devices or the nodes of the Internet of Things.

Generally, an on-board device includes autonomous software with limited resources such as for example a connected sensor or connected object. This type of devices has physical weaknesses that can be used by attacks via auxiliary channels, with these attacks consisting of exploiting the information leaks within a cryptographic calculation by analyzing the consumption of current or the electromagnetic radiation (EM). Thus, in the framework of an implementation of asymmetric cryptography on an on-board system or device, it is important to have protection against these attacks via auxiliary channels.

Cryptographic implementations are the subject of standards such as FIPS 186 which is currently the most widely used standard. Other standards can be found, in particular in the framework of cryptography on elliptic curves, such as the RFC 7748-8031-8032. All of these standards provide a framework for implementation but only rarely address problems concerning attacks via auxiliary channels.

In particular, a microcontroller within an on-board device has to carry out cryptographic operations including conditional operations which can be highly vulnerable faced with extractions of information during attacks via auxiliary channels.

Many articles address these problems and propose countermeasures in order to curb information leaks. By way of example, the article of Coron [1] proposes countermeasures to overcome certain weaknesses faced with advanced attacks by auxiliary channels.

However, attack techniques have become perfected. Recently, these attacks now have learning techniques in order to extract the most pertinent information in the sets of traces of current consumption or electromagnetic radiation which is ever increasing. The purpose of these attack techniques is to reduce the mass of data to the useful information thereof.

The object of the present invention is to propose a method and a system for masking that overcomes the aforementioned disadvantages and that provides effective countermeasures against any exploitation of information leaks within an implementation of asymmetric cryptography.

Presentation of the Invention

The present invention is defined by a masking method within an implementation of asymmetric cryptography, said implementation including a conditional exchange operation between first and second vectors used to manipulate input bits of a secret key, said conditional exchange operation being adapted to apply an exchange formula (in constant time) comprising a combination of a condition of an input bit with the first and second vectors so that the latter are interchanged only if the condition of the input bit is equal to '1', with the conditional exchange operation making use of at least one random number to mask said exchange formula before applying it.

This provides effective countermeasures against any exploitation of information leaks within a cryptographic calculation and in particular provides very good protection faced with advanced attacks via auxiliary channels.

Advantageously, the masking of the exchange formula includes the following steps:

drawing a first random number, masking the condition of the input bit by combining it with said first random number, replacing the condition of the input bit contained in said exchange formula with the masked condition of the input bit thus forming a first intermediate formula, introducing into said first intermediate formula a first compensation term according to the first random number in order to form a first-order masked exchange formula equivalent to said original exchange formula.

According to a preferred embodiment of the present invention, the masking of the exchange formula further includes the following steps:

drawing a second random number, combining the second random number with said first random number, replacing the first random number contained in the first compensation term of said first-order exchange formula with said combination of said first and second random numbers thus forming a second intermediate formula, introducing into said second intermediate formula a second compensation term according to the second random number in order to form a second-order masked exchange formula equivalent to said original exchange formula.

This makes it possible to break the link between the operations carried out and the condition of the input bit making it possible to have protections against attacks via profiling (templates) that use learning techniques.

According to an embodiment, the original exchange formula is a mathematical exchange formula constructed with mathematical operators and is defined according to the condition b of the input bit, of the first vector $R_{0,i}$, and of the second vector $R_{1,i}$, according to the following two equations:

$$R_{0,i} = R_{0,i} + b(R_{1,i} - R_{0,i}) \quad R_{1,i} = R_{1,i} - b(R_{1,i} - R_{0,i})$$

and the second-order masked exchange formula is constructed from said mathematical exchange formula by using furthermore the first random number $r_0$, and the second random number $r_1$, according to the following two equations:

$$R_{0,i} = R_{0,i} + (r_0 + b)(R_{1,i} - R_{0,i}) - (r_0 - r_1)(R_{1,i} - R_{0,i}) + r_1(R_{1,i} - R_{0,i})$$

$$R_{1,i} = R_{1,i} - (r_0 + b)(R_{1,i} - R_{0,i}) + (r_0 + r_1)(R_{1,i} - R_{0,i}) - r_1(R_{1,i} - R_{0,i})$$

Advantageously, the masking of the exchange formula makes use of N random numbers in order to construct a masked exchange formula with an order N greater than two.

This makes it possible to further increase the protection against any sort of attack without however significantly increasing the burden of the calculation steps. Indeed, the calculation time regarding the masking steps remains very negligible compared to that of the steps of cryptography.

Advantageously, the masked exchange formula of order N is constructed with mathematical operators and is defined according to the condition b of the input bit, of the first vector $R_{0,i}$ of the second vector $R_{1,i}$ and of N random numbers $r_0, \ldots, r_{N-1}$, according to the following two equations:

$$R_{0,i} = R_{0,i} + (r_0 + b)(R_{1,i} - R_{0,i}) +$$
$$\left(\sum_{n=1}^{N-1}(-1)^n(r_{n-1} + r_n)(R_{1,i} - R_{0,i})\right) + (-1)^N r_{N-1}(R_{1,i} - R_{0,i})$$

$$R_{1,i} = R_{1,i} - (r_0 + b)(R_{1,i} - R_{0,i}) -$$
$$\left(\sum_{n=1}^{N-1}(-1)^n(r_{n-1} + r_n)(R_{1,i} - R_{0,i})\right) - (-1)^N r_{N-1}(R_{1,i} - R_{0,i})$$

According to another embodiment, the original exchange formula is a logical exchange formula constructed with logical operators 'AND' and 'EXCLUSIVE OR' and is defined according to the condition b of the input bit, of the first vector $R_{0,i}$, and of the second vector $R_{1,i}$, according to the following two equations:

$$R_{0,i} = R_{0,i} \oplus b \wedge (R_{1,i} \oplus R_{0,i})\ R_{1,i} = R_{1,i} \oplus b \wedge (R_{1,i} \oplus R_{0,i})$$

and the masked exchange formula of order N is defined according to the condition b of the input bit, of the first vector $R_{0,i}$, of the second vector $R_{1,i}$, and of N random numbers $r_0, \ldots, r_{N-1}$, according to the following two equations:

$$R_{0,i} = R_{0,i} \oplus (r_0 \oplus b) \wedge (R_{1,0} \oplus R_{0,i}) \oplus$$
$$\left(\bigoplus_{n=1}^{N-1}(r_{n-1} \oplus r_n) \wedge (R_{1,i} \oplus R_{0,i})\right) \oplus r_{N-1} \wedge (R_{1,i} \oplus R_{0,i})$$

$$R_{1,i} = R_{1,i} \oplus (r_0 \oplus b) \wedge (R_{1,0} \oplus R_{0,i}) \oplus$$
$$\left(\bigoplus_{n=1}^{N-1}(r_{n-1} \oplus r_n) \wedge (R_{1,i} \oplus R_{0,i})\right) \oplus r_{N-1} \wedge (R_{1,i} \oplus R_{0,i})$$

According to yet another embodiment, the original exchange formula is an alternative mathematical exchange formula constructed with mathematical operators and is defined according to the condition b of the input bit, of the first vector $R_{0,i}$, and of the second vector $R_{1,i}$, according to the following two equations:

$$R_{0,i} = bR_{1,i} + (1-b)R_{0,i}\ R_{1,i} = bR_{0,i} + (1-b)R_{1,i}$$

and the masked exchange formula of order N is constructed from said alternative mathematical exchange formula by using furthermore N random numbers $r_0, \ldots, r_{N-1}$, according to the following two equations:

$$R_{0,i} = (b + r_0)R_{1,i} + (1 - (b + r_1))R_{0,i} - (r_0 + r_2)R_{1,i} - (r_1 + r_2)R_{0,i} +$$
$$\left(\sum_{n=2}^{N-1}(-1)^n(r_{n-1} + r_n)(R_{1,i} + R_{0,i})\right) - (-1)^{N-1} r_{N-1}(R_{1,i} + R_{0,i})$$

$$R_{1,i} = (b + r_0)R_{0,i} + (1 - (b + r_1))R_{1,i} - (r_0 + r_2)R_{0,i} - (r_1 + r_2)R_{1,i} +$$
$$\left(\sum_{n=2}^{N-1}(-1)^n(r_{n-1} + r_n)(R_{1,i} + R_{0,i})\right) - (-1)^{N-1} r_{N-1}(R_{1,i} + R_{0,i})$$

According to an embodiment, the asymmetric cryptography is based on elliptic curves including a scalar multiplication operation between a generator point P of an elliptic curve and the secret key k.

Cryptography on elliptic curves is an encryption technique that is economical in terms of key length and calculation time, which makes the use thereof particularly attractive in devices that are poor in resources.

According to another embodiment, the asymmetric cryptography is a cryptography of the RSA type.

The invention also relates to an integrated circuit including a set of security modules configured to implement an asymmetric cryptography operation, said set of modules comprising a conditional exchange module configured to exchange first and second vectors used to manipulate input bits of a secret key, said conditional exchange module being suitable for applying an exchange formula (in constant time) comprising a combination of a condition of an input bit with the first and second vectors so that the latter are interchanged only if the condition of the input bit is equal to '1', the conditional exchange module comprising a masking module suitable for making use of at least one random number to mask said exchange formula before it is applied, the masking module being configured to carry out the masking of the exchange formula according to the following steps:

drawing a first random number,
masking the condition of the input bit by combining it with said first random number,
replacing the condition of the input bit contained in said exchange formula with the masked condition of the input bit thus forming a first intermediate formula,
introducing into said first intermediate formula a first compensation term according to the first random number in order to form a first-order masked exchange formula equivalent to said original exchange formula.

The invention also concerns an on-board device including a microcontroller configured to implement the method of masking according to any of the characteristics hereinabove.

The invention also relates to a masking system within an integrated circuit configured to implement an asymmetric cryptography operation, said implementation including a conditional exchange operation between first and second vectors used to manipulate input bits of a secret key, said conditional exchange operation being adapted to apply an exchange formula (in constant time) comprising a combination of a condition of an input bit with the first and second vectors so that the latter are interchanged only if the condition of the input bit is equal to '1', said system making use of at least one random number to mask said exchange formula before it is applied, with the masking system being configured to carry out the masking of the exchange formula according to the following steps:

drawing a first random number,
masking the condition of the input bit by combining it with said first random number,
replacing the condition of the input bit contained in said exchange formula with the masked condition of the input bit thus forming a first intermediate formula,
introducing into said first intermediate formula a first compensation term according to the first random number in order to form a first-order masked exchange formula equivalent to said original exchange formula.

BRIEF DESCRIPTION OF THE FIGURES

FIG. 2 and

DESCRIPTION OF EMBODIMENTS

The principle of the invention is to use a masking technique that thwarts any information leak that can be exploited during attacks via auxiliary channels.

Figure 1:
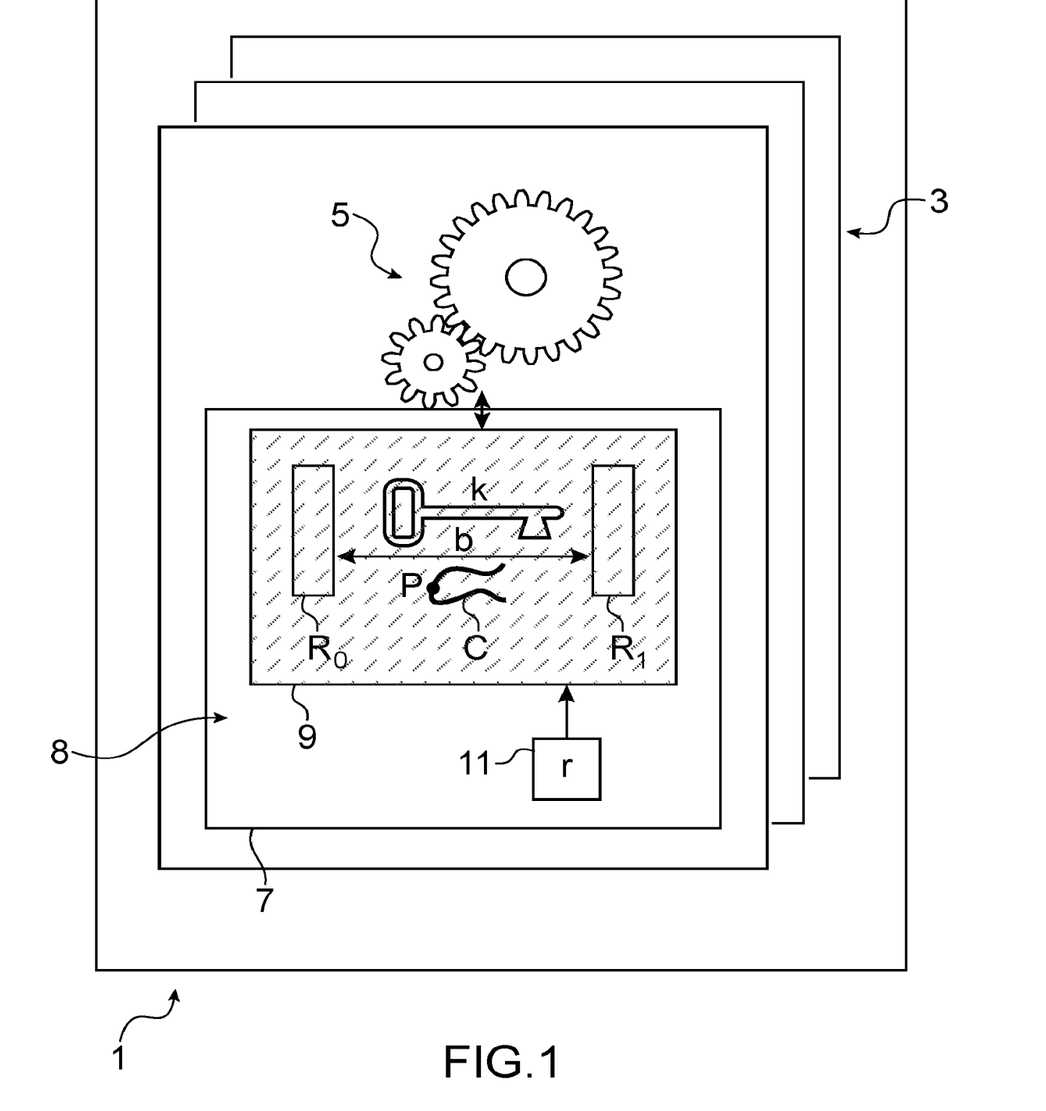
FIG. 1 diagrammatically shows a masking system within an integrated circuit suitable for implementing an asymmetric cryptography operation, according to an embodiment of the invention.

FIG. 1 diagrammatically shows a masking system within an integrated circuit suitable for implementing an asymmetric cryptography operation, according to an embodiment of the invention.

The integrated circuit 1 is a microprocessor or a microcontroller including a set of modules 3 or hardware and/or security software configured to implement asymmetric cryptography operations 5.

Asymmetric cryptography 5 is an encryption technique of the RSA type or based on elliptic curves C of which the purpose is to guarantee the confidentiality of the data. In particular, cryptography on elliptic curves makes use of the difficulty in resolving the discrete logarithm problem (DLP) on a finished cyclic group. This technique includes a step of scalar multiplication that directly manipulates the bits b of a secret key k and a generator point P on a curve C in order to form the corresponding public key given by the coordinates of kP. This manipulation of the bits b of the secret key k uses first and second registers or vectors $R_0$ and $R_1$.

Note that searching for the private key k from the public key and the generator point P is more arduous than the DLP problem on the finished body and, in the current context, impossible to resolve in a polynomial time. These bits are therefore very sensitive and must not leak via auxiliary channels. To do this, a scalar multiplication algorithm is generally used which does not allow any information to leak. The algorithm of the Montgomery Ladder [2] is often used because the same operations are carried out whether a bit '0' or a bit '1' is processed. The algorithm 1 hereinbelow presents the various steps of the Montgomery Ladder.

| Algorithm 1 Montgomery Ladder |
|---|
| Require: P, k = $(k_{t-1}, \ldots, k_0)_2$ |
| 1:      $R_0 \leftarrow O$ |
| 2:      $R_1 \leftarrow P$ |
| 3:      for j = t − 1 to 0 do |
| 4:         if $k_j$ = 0 then |
| 5:            $R_1 \leftarrow R_0 + R_1$ |
| 6:            $R_0 \leftarrow 2R_0$ |
| 7:         else |
| 8:            $R_0 \leftarrow R_0 + R_1$ |
| 9:            $R_1 \leftarrow 2R_1$ |
| 10:         end if |
| 11:      end for |
| 12:      return $R_0$ = kP, $R_1$ = kP + P |

However, in step 4 of Algorithm 1, there is a conditional 'IF' instruction which makes it possible to differentiate the calculations between a bit at '0' and a bit at '1'. One of the constraints of secure implementations is to have an implementation in constant time, i.e. the execution time does not depend on bits b of the key k. To do this, using conditional instructions that, in fact, do not induce the same execution time according to the input condition is avoided. A widespread technique for overcoming this is to use a conditional exchange algorithm of vectors in constant time, or conditional swap (cswap). The preceding algorithm is then slightly changed into a Montgomery Ladder algorithm in constant time in the following way:

| Algorithm 2 Conctant Time Montgomery Ladder |
|---|
| Require: P, k = $(k_{t-1}, \ldots, k_0)_2$ |
| 1:      $R_0 \leftarrow O$ |
| 2:      $R_1 \leftarrow P$ |
| 3:      for j = t − 1 to 0 do |
| 4:         cswap($R_1$, $R_0$, $k_j$) |
| 5:         $R_1 \leftarrow R_0 + R_1$ |
| 6:         $R_0 \leftarrow 2R_0$ |
| 7:         cswap($R_1$, $R_0$, $k_j$) |
| 8:      end for |
| 9:      return $R_0$ = kP, $R_1$ = kP + P |

Thus, in order to implement the algorithm 2, the set of modules 3 of the integrated circuit 1 comprises a conditional exchange module 7 configured to exchange the first and second vectors $R_0$ and $R_1$ used to manipulate the input bits b of the secret key k.

The conditional exchange module 7 applies the same formula to all the words that form the first and second vectors $R_0$ and $R_1$. This formula takes as input a condition b of the input bit of the secret key k and it does not change the result if b=0 and it exchanges $R_0$ and $R_1$ if b=1.

In order to carry out an exchange between the two vectors $R_0$ and $R_1$ comprised of n words $R_{0,i}$ and $R_{1,i}$, an exchange formula is used that can be defined in the following way:

$$F(b,R_{0,i},R_{1,i})=F(b,R_{v,i};v=0 \text{ ou } 1) \quad (1)$$

such that $$R_{vi} = \begin{cases} R_{v,i} & b = 0 \\ R_{1-v,i} & b = 1 \end{cases} \quad (2)$$

This exchange formula in constant time comprises a combination of the condition b of the input bit with the first and second vectors $R_{0,i}$ and $R_{1,i}$ so that the latter are interchanged only if the condition b of the input bit is equal to '1'. Note that the exchange formula can be a logical or mathematical formula and can be expressed in different ways.

An example of a mathematical exchange formula (i.e. constructed with mathematical operators) is defined according to the condition b of the input bit, of the first vector $R_{0,i}$, and of the second vector $R_{1,i}$, according to the following two equations:

$$R_{0,i}=R_{0,i}+b(R_{1,i}-R_{0,i}) \quad R_{1,i}=R_{1,i}-b(R_{1,i}-R_{0,i}) \quad (3)$$

These equations of the exchange formula indicate if the condition b of the input bit is equal to '0', the words of the first and second vectors $R_{0,i}$ and $R_{1,i}$ do not change while, if the condition b of the input bit is equal to '1', the words of the first and second vectors $R_{0,i}$ and $R_{1,i}$ are interchanged. This conditional exchange technique is found in libraries of embedded software such as mbedTLS.

However, this exchange formula (3) is not free of defects. Indeed, if only the result of the multiplication by the condition b is considered, then the result is zero if b=0 and different from 0 if b=1. Thus, multiplication induces a great difference in the Hamming weight of the result (i.e. the number of bits at 1). In particular, if b=0, the Hamming weight is equal to zero and if b=1, the Hamming weight is different from zero. Such a difference is easy to distinguish by attacks via auxiliary channels of the template attack type

[3]. This type of attack thus makes it possible to distinguish a multiplication by 0 or by 1.

The present invention resolves this problem by masking the conditional exchange operation cswap. Indeed, in accordance with the present invention, the conditional exchange module 7 comprises a masking system 8 comprising a masking module 9 and a random number generator 11. The masking module 9 is suitable for making use of at least one random number r coming from the random number generator 11 to mask the exchange formula before it is applied. The dimension of the random number r is selected as being equal to the size of the architecture used in the integrated circuit 1. For example, if the architecture is 32 bits (or 64 bits), the random number r is also 32 bits (or 64 bits respectively).

Figure 2:
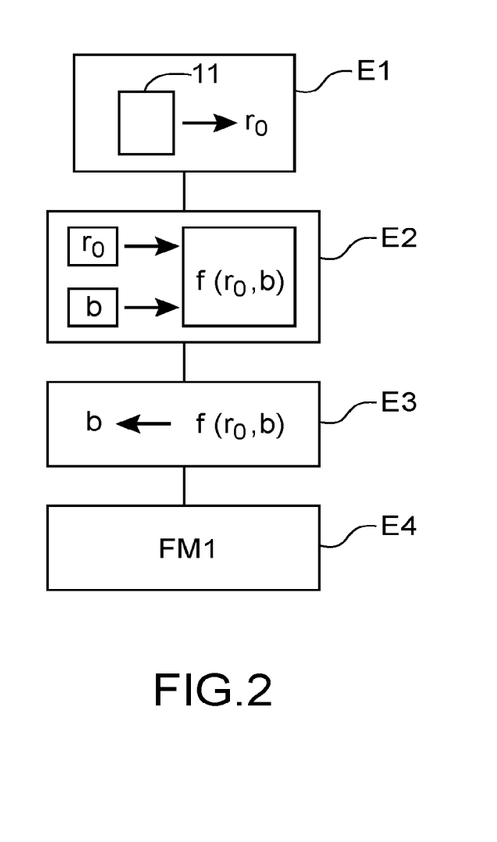
Figure 3:
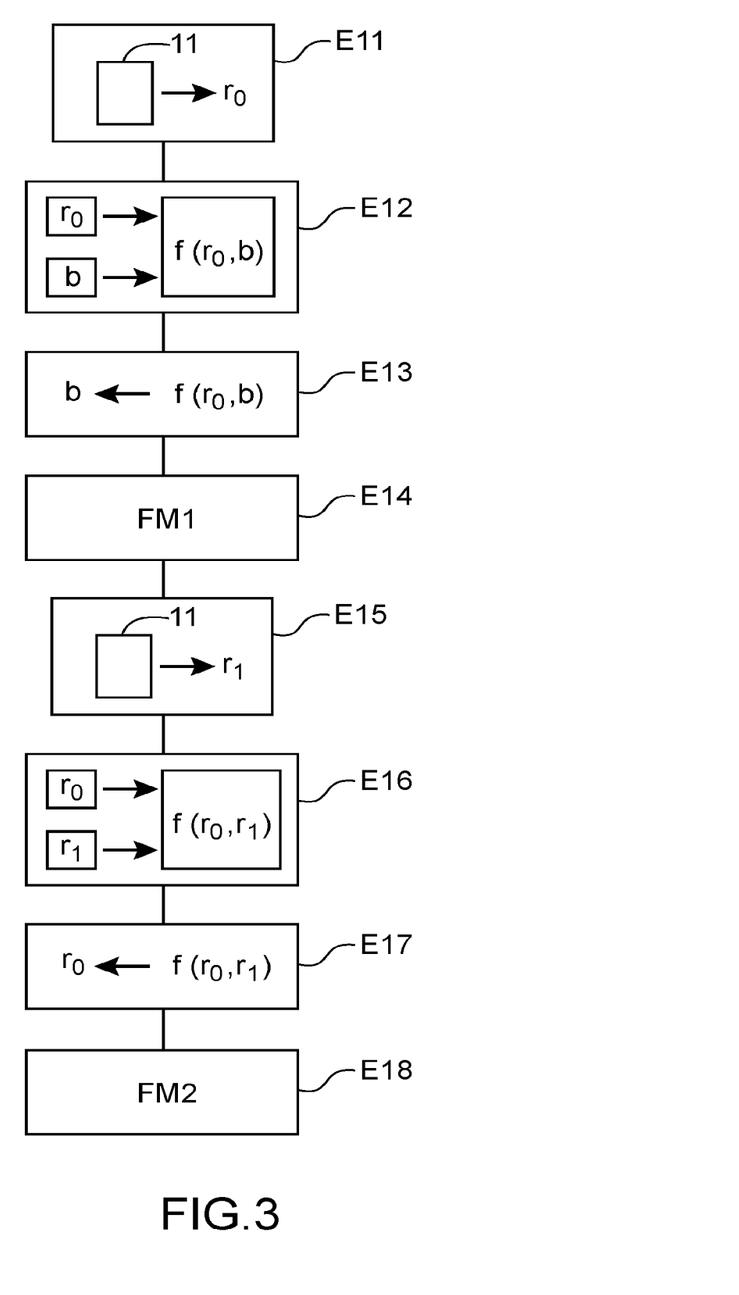
FIG. 3 are flow charts which diagrammatically show a masking method within an asymmetric cryptography operation, according to an embodiment of the invention.

FIGS. 2 and 3 are flow charts that diagrammatically show a masking method within an asymmetric cryptography operation, according to an embodiment of the invention.

Steps E1-E4 of FIG. 2 show the masking of the exchange formula by means of a random number $r_0$.

In step E1, the masking module 9, and more particularly the random number generators 11, is suitable for drawing a first random number $r_0$ which will double for masking.

In step E2, the masking module 9 is suitable for masking the input bit b by combining it with the first random number $r_0$. According to the nature of the exchange formula (i.e. mathematical or logical), the combination $f(r_0, b)$ between the input bit b and the first random number $r_0$ is carried out with a mathematical operator of the 'addition' type or a logical operator of the 'EXCLUSIVE OR' type.

For example, in the mathematical exchange formula according to the two equations (3), the first random number $r_0$ is added to the condition b of the input bit in order to form a masked input bit '$r_0+b$'.

In step E3, the masking module 9 is suitable for replacing the condition b of the input bit contained in the exchange formula with the masked input bit (for example $r_0+b$) thus forming a first intermediate formula.

In step E4, the masking module 9 is suitable for introducing into the first intermediate formula a first compensation term according to the first random number in order to form a first-order masked exchange formula FM1, equivalent to the original exchange formula.

For example, in the mathematical exchange formula according to the two equations (3), the first random number $r_0$ is added to the condition b of the input bit in order to form a masked input bit '$r_0+b$'. Then, the condition b of the input bit contained in the original exchange formula is replaced with the masked input bit '$r_0+b$' in order to form the following intermediate formula:

$$R_{0,i}=R_{0,i}+(r_0+b)(R_{1,i}-R_{0,i}) \quad (4)$$

$$R_{1,i}=R_{1,i}-(r_0+b)(R_{1,i}-R_{0,i}) \quad (5)$$

In order to rebalance the formula, a first compensation term '$r_0(R_{1,i}-R_{0,i})$' is introduced into the equations (4) and (5) of the intermediate formula. This allows for the formation of the following first-order masked exchange formula:

$$R_{0,i}=R_{0,i}+(r_0+b)(R_{1,i}-R_{0,i})-r_0(R_{1,i}-R_{0,i}) \quad (6)$$

$$R_{1,i}=R_{1,i}-(r_0+b)(R_{1,i}-R_{0,i})+r_0(R_{1,i}-R_{0,i}) \quad (7)$$

The equations (6) and (7) are mathematically equivalent to the equations (3) of the original exchange formula.

The masking hereinabove provides protection against many attacks via auxiliary channels. However, the masking applied may not be sufficient against certain attacks that use learning techniques. Indeed, if the condition bit b is zero then the two multiplications of the formula are identical while if b=1, the two multiplications are different. However, certain advanced attacks by templates can distinguish whether or not the same operation is being carried out.

Advantageously, the flow chart according to FIG. 3 makes it possible to break the link that exists between the operations carried out and the condition bit b.

Steps E11-E14 are identical to steps E1-E4 of FIG. 2 and relate to the masking of the exchange formula with a first random number in order to form the first-order masked exchange formula according to equations (6) and (7).

Moreover, in step E15, the masking module 9 is suitable for drawing a second random number $r_1$.

In step E16, the masking module 9 is suitable for combining the second random number $r_1$ with the first random number $r_0$. The combination $f(r_0, r_1)$ between the first and second random numbers is carried out with a mathematical operator (for example, $r_0+r_1$) or logical operator according to the nature of the original exchange formula.

In step E17, the masking module 9 is suitable for replacing the first random number $r_0$ contained in the first compensation term of the first-order exchange formula FM1 (calculated in step E14) with the combination $f(r_0, r_1)$ of the first and second random numbers (calculated in step E16), thus forming a second intermediate formula.

In step E18, the masking module 9 is suitable for introducing into the second intermediate exchange formula a second compensation term according to the second random number. This forms a second-order masked exchange formula FM2, equivalent to said original exchange formula.

For example, in the first-order exchange formula according to the two equations (6) and (7), the second random number $r_1$ is added to the first random number $r_0$ in order to form the sum of random numbers '$r_0+r_1$'. Then, the first random number $r_0$ contained in the first compensation term of the first-order exchange formula (6) and (7) is replaced with the sum of random numbers '$r_0+r_1$'. This forms the following second intermediate formula:

$$R_{0,i}=R_{0,i}+(r_0+b)(R_{1,i}-R_{0,i})-(r_0+r_1)(R_{1,i}-R_{0,i}) \quad (8)$$

$$R_{1,i}=R_{1,i}-(r_0+b)(R_{1,i}-R_{0,i})+(r_0+r_1)(R_{1,i}-R_{0,i}) \quad (9)$$

Finally, the formula is rebalanced by introducing a second compensation term '$r_i(R_{1,i}-R_{0,i})$' into the equations (8) and (9) of the second intermediate formula in order to form the following second-order masked exchange formula:

$$R_{0,i}=R_{0,i}+(r_0+b)(R_{1,i}-R_{0,i})-(r_0+r_1)(R_{1,i}-R_{0,i})+r_1(R_{1,i}-R_{0,i}) \quad (10)$$

$$R_{1,i}=R_{1,i}-(r_0+b)(R_{1,i}-R_{0,i})+(r_0+r_1)(R_{1,i}-R_{0,i})-r_1(R_{1,i}-R_{0,i}) \quad (11)$$

This formula is mathematically equivalent to the original exchange formula (3) while still having two masks with three multiplications thus providing protection that is largely sufficient against attacks via templates that use learning techniques. Indeed, it can be noted that regardless of the condition bit b, the three multiplications in the second-order masked exchange formula are different and the result is non-zero. Thus, no correlation exists between the Hamming weight and the condition bit b.

Advantageously, the calculation surplus generated by this countermeasure is minimal. Indeed, for a second-order masking, only two additional instructions are used which induces insignificant additional calculation time compared to the entire cryptographic calculation (for example, on elliptic curves) carried out during an electronic signature for example.

The masking formula can be generalized for a mask of order N defined according to the condition b of the input bit, of the first vector $R_{0,i}$, of the second vector $R_{1,i}$ and of N random numbers $r_0, \ldots, r_{N-1}$, according to the following two equations:

$$R_{0,i} = R_{0,i} + (r_0 + b)(R_{1,i} - R_{0,i}) + \left(\sum_{n=1}^{N-1}(-1)^n(r_{n-1} + r_n)(R_{1,i} - R_{0,i})\right) + (-1)^N r_{N-1}(R_{1,i} - R_{0,i}) \quad (12)$$

$$R_{1,i} = R_{1,i} - (r_0 + b)(R_{1,i} - R_{0,i}) - \left(\sum_{n=1}^{N-1}(-1)^n(r_{n-1} + r_n)(R_{1,i} - R_{0,i})\right) - (-1)^N r_{N-1}(R_{1,i} - R_{0,i}) \quad (13)$$

This generalized mask that makes use of N random numbers makes it possible to anticipate a change that is even more sophisticated of the attacks and thus increases the protection over time against these attacks.

Alternatively, the original exchange formula defined by the equations (3) can be rewritten in the following way:

$$R_{0,i} = bR_{1,i} + (1-b)R_{0,i} \quad R_{1,i} = bR_{0,i} + (1-b)R_{1,i} \quad (14)$$

As hereinabove, this alternative exchange formula is constructed with mathematical operators and is defined according to the condition b of the input bit, of the first vector $R_{0,i}$, and of the second vector $R_{1,i}$.

The same steps of the algorithm shown in FIG. 3 can be applied in a recurrent manner in order to construct a masked exchange formula of order N (N≥1) from the alternative mathematical exchange formula by using the N random numbers $r_0, \ldots, r_{N-1}$, according to the following two equations:

$$R_{0,i} = (b+r_0)R_{1,i} + (1-(b+r_1))R_{0,i} - (r_0+r_2)R_{1,i} - (r_1+r_2)R_{0,i} + \left(\sum_{n=2}^{N-1}(-1)^n(r_{n-1}+r_n)(R_{1,i}+R_{0,i})\right) - (-1)^{N-1} r_{N-1}(R_{1,i}+R_{0,i})$$

$$R_{1,i} = (b+r_0)R_{0,i} + (1-(b+r_1))R_{1,i} - (r_0+r_2)R_{0,i} - (r_1+r_2)R_{1,i} + \left(\sum_{n=2}^{N-1}(-1)^n(r_{n-1}+r_n)(R_{1,i}+R_{0,i})\right) - (-1)^{N-1} r_{N-1}(R_{1,i}+R_{0,i})$$

Again alternatively, it is possible to start with a logical exchange formula constructed with logical operators 'AND' and 'EXCLUSIVE OR' according to the condition b of the input bit, of the first vector $R_{0,i}$, and of the second vector $R_{1,i}$, according to the following two equations:

$$R_{0,i} = R_{0,i} \oplus b \char`\^ (R_{1,i} \oplus R_{0,i}) \quad R_{1,i} = R_{1,i} \oplus b \char`\^ (R_{1,i} \oplus R_{0,i}) \quad (17)$$

This time, the condition b is no longer a single bit 0 or 1 but 0 if the conditional exchange 'cswap' must have no effect or 0xFF . . . FF if the cswap must have an effect.

The same steps of the algorithm shown in FIG. 3 can be applied in a recurring manner in order to construct a masked exchange formula of order N (N≥1) from the logical exchange formula by using N random numbers $r_0, \ldots, r_{N-1}$, according to the following two equations:

$$R_{0,i} = R_{0,i} \oplus (r_0 \oplus b) \wedge (R_{1,0} \oplus R_{0,i}) \oplus \quad (18)$$

$$\left(\bigoplus_{n=1}^{N-1}(r_{n-1} \oplus r_n) \wedge (R_{1,i} \oplus R_{0,i})\right) \oplus r_{N-1} \wedge (R_{1,i} \oplus R_{0,i})$$

$$R_{1,i} = R_{1,i} \oplus (r_0 \oplus b) \wedge (R_{1,0} \oplus R_{0,i}) \oplus \quad (19)$$

$$\left(\bigoplus_{n=1}^{N-1}(r_{n-1} \oplus r_n) \wedge (R_{1,i} \oplus R_{0,i})\right) \oplus r_{N-1} \wedge (R_{1,i} \oplus R_{0,i})$$

The present invention can be used very widely in on-board devices. "On-board device" means a device including autonomous software with limited resources such as for example a connected sensor or connected object of the connected watch type.

Note that the present invention can apply to all on-board cryptography implementations such as for example mbedTLS from ARM or OpenSSL and OpenSSH. Generally, the calculation surplus generated by this countermeasure is minimal. Indeed, for a second-order masking, only two additional instructions are required which induces insignificant additional calculation time compared to the entire calculation on elliptic curves carried out during an electronic signature for example.

Biography

1—J.-S. Coron, "Resistance Against Differential Power Analysis for Elliptic Curve Cryptosystems", presented at Cryptographic Hardware and Embedded Systems, 1999.

2—M. Joye and S.-M. Yen, "The Montgomery powering ladder", in International Workshop on Cryptographic Hardware and Embedded Systems, 2002, p. 291-302.

3—L. Batina, Ł. Chmielewski, L. Papachristodoulou, P. Schwabe, and M. Tunstall, "Online template attacks", Journal of Cryptographic Engineering, August 2017.

The invention claimed is:

1. A method for masking cryptographic operations of a microcontroller within an on-board device during attacks via auxiliary channels, comprising a conditional exchange operation between first and second vectors (R0, R1) used to manipulate input bits of a secret key (k), said conditional exchange operation being adapted to apply an exchange formula comprising a combination of a condition (b) of the input bit with the first and second vectors so that the latter are interchanged only if the condition (b) of the input bit is equal to '1', wherein the conditional exchange operation makes use of at least one random number to mask said exchange formula before applying the exchange formula, with the masking of the exchange formula including the following steps:
   drawing a first random number,
   masking the condition (b) of the input bit by combining the input bit with said first random number,
   replacing the condition of the input bit contained in said exchange formula with the masked condition of the input bit thus forming a first intermediate formula, and
   introducing into said first intermediate formula a first compensation term according to the first random number in order to form a first-order masked exchange formula equivalent to said original exchange formula.

2. The method according to claim 1, wherein the masking of the exchange formula further includes the following steps: drawing a second random number, combining the second random number with said first random number, replacing the first random number contained in the first compensation term of said first-order exchange formula with said combination of said first and second random numbers thus forming a second intermediate formula, introducing into said second intermediate formula a second compensation term according to the second random number in order to form a second-order masked exchange formula equivalent to said original exchange formula.

3. The method according to claim 2, wherein the original exchange formula is a mathematical exchange formula constructed with mathematical operators and is defined according to the condition (b) of the input bit, of the first vector $R_{0,i}$, and of the second vector $R_{1,i}$, according to the following two equations:

$$R_{0,i}=R_{0,i}+b(R_{1,i}-R_{0,i}) \ R_{1,i}=R_{1,i}-b(R_{1,i}-R_{0,i})$$

and wherein the second-order masked exchange formula is constructed from said mathematical exchange formula by using furthermore the first random number ro, and the second random number $r_f$, according to the following two equations:

$$R_{0,i}=R_{0,i}+(r_0+b)(R_{1,i}-R_{0,i})-(r_0+r_1)(R_{1,i}-R_{0,i})+r_1(R_{1,i}-R_{0,i})$$

$$R_{1,i}=R_{1,i}-(r_0+b)(R_{1,i}-R_{0,i})+(r_0+r_1)(R_{1,i}-R_{0,i})-r_1(R_{1,i}-R_{0,i}).$$

4. The method according to claim 1 wherein the masking of the exchange formula makes use of N random numbers in order to construct a masked exchange formula with an order N greater than two.

5. The method according to claim 4, wherein the masked exchange formula of order N is constructed with mathematical operators and is defined according to the condition b of the input bit, of the first vector $R_{0,i}$, of the second vector $R_{I,i}$, and of N random numbers ro, . . . , $r_{N-1}$, according to the following two equations:

$$R_{0,i} = R_{0,i} + (r_0 + b)(R_{1,i} - R_{0,i}) + \left(\sum_{n=1}^{N-1}(-1)^n(r_{n-1} + r_n)(R_{1,i} - R_{0,i})\right) + (-1)^N r_{N-1}(R_{1,i} - R_{0,i})$$

$$R_{1,i} = R_{1,i} - (r_0 + b)(R_{1,i} - R_{0,i}) - \left(\sum_{n=1}^{N-1}(-1)^n(r_{n-1} + r_n)(R_{1,i} - R_{0,i})\right) - (-1)^N r_{N-1}(R_{1,i} - R_{0,i}).$$

6. The method according to claim 4, wherein the original exchange formula is a logical exchange formula constructed with logical operators 'AND' and 'EXCLUSIVE OR' and is defined according to the condition b of the input bit, of the first vector $R_{0,i}$, and of the second vector $R_{f1}$, according to the following two equations:

$$R_{0,i}=R_{0,i}\oplus b\char`\^(R_{1,i}\oplus R_{0,i}) \ R_{1,i}=R_{1,i}\oplus b\char`\^(R_{1,i}\oplus R_{0,i})$$

and wherein the masked exchange formula of order N is defined according to the condition b of the input bit, of the first vector $R_{0,i}$, of the second vector $R_{1,i}$, and of N random numbers $r_o$, . . . , $r_{N-1}$, according to the following two equations:

$$R_{0,i} = R_{0,i} \oplus (r_0 \oplus b) \wedge (R_{1,0} \oplus R_{0,i}) \oplus$$

$$\left(\bigoplus_{n=1}^{N-1}(r_{n-1} \oplus r_n) \wedge (R_{1,i} \oplus R_{0,i})\right) \oplus r_{N-1} \wedge (R_{1,i} \oplus R_{0,i})$$

$$R_{1,i} = R_{1,i} \oplus (r_0 \oplus b) \wedge (R_{1,0} \oplus R_{0,i}) \oplus$$

$$\left(\bigoplus_{n=1}^{N-1}(r_{n-1} \oplus r_n) \wedge (R_{1,i} \oplus R_{0,i})\right) \oplus r_{N-1} \wedge (R_{1,i} \oplus R_{0,i}).$$

7. The method according to claim 1, wherein the original exchange formula is an alternative mathematical exchange formula constructed with mathematical operators and is defined according to the condition b of the input bit, of the first vector $R_{0,i}$, and of the second vector $R_{1,i}$, according to the following two equations:

$$R_{0,i}=bR_{1,i}+(1-b)R_{0,i} \ R_{1,i}=bR_{0,i}+(1-b)R_{1,i}$$

and wherein the masked exchange formula of order N is constructed from said alternative mathematical exchange formula by using furthermore N random numbers ro . . . $r_{N-1}$, according to the following two equations:

$$R_{0,i} = (b + r_0)R_{1,i} + (1 - (b + r_1))R_{0,i} - (r_0 + r_2)R_{1,i} - (r_1 + r_2)R_{0,i} +$$

$$\left(\sum_{n=2}^{N-1}(-1)^n(r_{n-1} + r_n)(R_{1,i} + R_{0,i})\right) - (-1)^{N-1}r_{N-1}(R_{1,i} + R_{0,i})$$

$$R_{1,i} = (b + r_0)R_{0,i} + (1 - (b + r_1))R_{1,i} - (r_0 + r_2)R_{0,i} - (r_1 + r_2)R_{1,i} +$$

$$\left(\sum_{n=2}^{N-1}(-1)^n(r_{n-1} + r_n)(R_{1,i} + R_{0,i})\right) - (-1)^{N-1}r_{N-1}(R_{1,i} + R_{0,i}).$$

8. The method according to claim 1 wherein the cryptography is based on elliptic curves including a scalar multiplication operation between a generator point (P) of an elliptic curve and the secret key (k).

9. The method according to claim 1, wherein the cryptography is a cryptography of the RSA type.

10. An on-board device comprising a microcontroller configured to implement the method of masking according to claim 1.

11. An integrated circuit comprising a set of security modules configured to implement cryptographic operations of a microcontroller within an on-board device during attacks via auxiliary channels, said set of modules comprising a conditional exchange module configured to exchange first and second vectors ($R_0$, $R_1$) used to manipulate input bits of a secret key (k), said conditional exchange module being suitable for applying an exchange formula comprising a combination of a condition (b) of the input bit with the first and second vectors ($R_0$, Ri) so that the latter are interchanged only if the condition (b) of the input bit is equal to '1', wherein the conditional exchange module comprises a masking module configured to make use of at least one random number (r) to mask said exchange formula before the exchange formula is applied according to the following steps: drawing a first random number, masking the condition (b) of the input bit by combining the input bit with said first random number, replacing the condition of the input bit contained in said exchange formula with the masked condition of the input bit thus forming a first intermediate formula, introducing into said first intermediate formula a first compensation term according to the first random number in order to form a first-order masked exchange formula equivalent to said original exchange formula.

12. A masking system within an integrated circuit configured to implement cryptographic operations of a microcontroller within an on-board device during attacks via auxiliary channels, said implementation including a conditional exchange operation between first and second vectors ($R_0$, $R_1$) used to manipulate input bits of a secret key (k), said conditional exchange operation being adapted to apply an exchange formula comprising a combination of a condition (b) of the input bit with the first and second vectors ($R_0$, $R_1$) so that the latter are interchanged only if the condition (b) of the input bit is equal to '1', wherein said system makes use of at least one random number to mask said exchange formula before the exchange formula is applied according to the following steps: drawing a first random number, masking the condition (b) of the input bit by combining the input bit with said first random number, replacing the condition of the input bit contained in said exchange formula with the masked condition of the input bit thus forming a first intermediate formula, introducing into said first intermediate formula a first compensation term according to the first random number in order to form a first-order masked exchange formula equivalent to said original exchange formula.

* * * * *